United States Patent [19]

Hardy

[11] Patent Number: 4,740,803
[45] Date of Patent: Apr. 26, 1988

[54] PHOTO IMAGING SYSTEM USING TWO-DIMENSIONAL OPTICAL LENS ARRAY

[75] Inventor: James A. Hardy, Rochester, N.Y.

[73] Assignee: Eastman Kodak Company, Rochester, N.Y.

[21] Appl. No.: 66,873

[22] Filed: Jun. 25, 1987

[51] Int. Cl.$^4$ .......................... G03B 17/24; G02B 6/06
[52] U.S. Cl. ...................................... 354/80; 354/106; 355/1; 350/96.25
[58] Field of Search ............................ 354/80, 105–109; 355/1, 39, 41; 350/96.25

[56] References Cited

U.S. PATENT DOCUMENTS

| | | | |
|---|---|---|---|
| 4,331,380 | 5/1982 | Rees et al. | 350/96.25 |
| 4,361,388 | 11/1982 | Mleak et al. | 354/106 |
| 4,459,010 | 7/1984 | Hinton et al. | 355/1 |

OTHER PUBLICATIONS

"Luminous Intensity of a Gradient-Index Lens Array", M. Toyama and M. Takami, *Applied Optics*, vol. 21, No. 6, Mar. 15, 1982, pp. 1013–1016.
"Unevenness of Illuminance Caused by Gradient-Index Fiber Arrays", K. Matsushita and M. Toyama, *Applied Optics*, vol. 19, No. 7, Apr. 1, 1980, pp. 1070–1075.
"Chromatic Aberration of the Selfoc Lens as an Imaging System", K. Nishizawa, *Applied Optics*, vol. 19, No. 7, Apr. 1, 1980, pp. 1052–1055.

*Primary Examiner*—L. T. Hix
*Assistant Examiner*—David M. Gray
*Attorney, Agent, or Firm*—Robert H. Sproule

[57] ABSTRACT

A photo imaging system includes a two-dimensional lens array for forming an image of an object on a receptor element. The lens array includes a number of optical glass fibers which are mounted in rows between supporting plates so that each row is adjacent to a plate. This causes the optical fibers to be supported in a parallel manner to reduce distortion which is caused by unsupported bending or flexing of the fibers. Since the lens array and receptor element remain fixed relative to each other during image formation, formation of a complete image of the object is achieved by providing a lens array having a sufficient number of fiber rows.

7 Claims, 2 Drawing Sheets

PHOTO IMAGING SYSTEM USING TWO-DIMENSIONAL OPTICAL LENS ARRAY

TECHNICAL FIELD

The present invention pertains to a photo imaging system which utilizes a two-dimensional optical lens array for forming an image on a receptor surface where the positions of the receptor surface and lens array remain fixed relative to each other during formation of the image.

BACKGROUND OF THE INVENTION

A frequent goal in the design of photographic equipment is a reduction in its overall size and weight. This is particularly true with regard to portable cameras where a reduction in size and weight allows the camera to be more easily transported, as well as more easily manipulated during photographic use.

A significant factor which dictates the size of photographic equipment is the total conjugate distance, i.e., the distance measured along the optical axis between the object and the image. The total conjugate distance (TC) is a function of the focal length of the lens. In a camera, for example, which houses both an object field such as data card, and a receptor surface, such as photographic film, the ability to reduce the total conjugate distance is important in reducing the overall size of the camera.

SUMMARY OF THE INVENTION

In the present invention, there is provided a photographic system which in an exemplary embodiment pertains to a camera. The camera includes a slot for receiving and supporting a data card, a light source for illuminating this data, and a lens array for focusing an image of the data onto a photosensitive medium. To achieve a small total conjugate distance, the lens is in the form of an optical fiber array which is characterized in that it does not move relative to the photosensitive medium during image formation. To achieve a two-dimensional image, the lens array is formed by a selected number of parallel rows of optical fibers, with each row being mounted adjacent to a supporting plate. The supporting plates aid in preventing the fibers from becoming misaligned in order to prevent image distortion. Each optical fiber generates an image having a positive one-to-one magnification. In this manner, the array is sufficiently dimensioned along its X and Y axes to form a complete image on the photosensitive medium. Images formed by adjacent rows of optical fibers overlap.

More broadly, the invention pertains to a photo imaging apparatus comprising container means, as well as means for supporting an object element inside the container means. Also provided are means for supporting a photosensitive image receptor inside the container means, along with means for illuminating the object element.

Also provided are lens array means which are mounted inside the container means for forming an image of the object element onto the image receptor. The lens array is non-movable with respect to the receptor element when the image is being formed. The lens array further includes a plurality of generally parallel optical fibers having sides which extend in lengthwise manner intermediate the object support means and the receptor support means. The fibers are mounted together to form parallel rows. Also provided are a plurality of plates mounted adjacent to the sides of the fibers to provide for their support in a manner that there is a support plate adjacent to each optical fiber row.

It is therefore an object of the present invention to provide a photo imaging system which utilizes an optical fiber lens array to form an image.

BRIEF DESCRIPTION OF THE DRAWINGS

This and other objects and advantages of the present invention will become more readily apparent upon reading the following detailed description in conjunction with the attached drawings, in which.

DETAILED DESCRIPTION OF THE INVENTION

Figure 1:
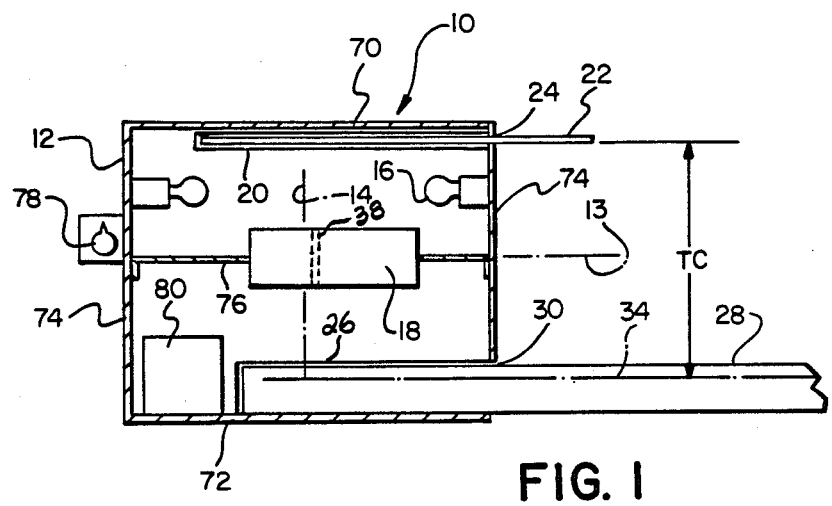
FIG. 1 is a side view of an exemplary camera embodiment of the photo imaging system of the present invention.

In the present invention, there is provided a photo imaging system which includes a light source which illuminates an object element through a lens array to form an image onto a photosensitive medium. In an exemplary embodiment shown in FIG. 1, briefly, this photo imaging system pertains to a camera indicated at 10, including an exterior housing 12, having a horizontal axis designated by a line 13 and a vertical axis designated by a line 14. The housing enclosed a pair of electrically operated lights 16, a lens 18, an upper support frame 20 for holding a removable data card 22 which has been inserted through a side slot 24 in the housing, and a lower support frame 26 for holding a removable photosensitive film cartridge 28 inserted through a lower side slot 30 in the camera housing. Preferably, the cartridge 28 contains a photosensitive film such as x-ray film, and the data card 22 contains data, such as a patent's name, which is imaged onto a corner of the film for later identification.

As discussed previously, it is desirable to minimize the size of the camera to enhance its portability. This is accomplished by minimizing the vertical dimension of the camera by in turn minimizing the total conjugate distance, identified by the letters TC in FIG. 1, between the data card lower surface and the film plane upper surface 34 of the cartridge 28.

Figure 2:
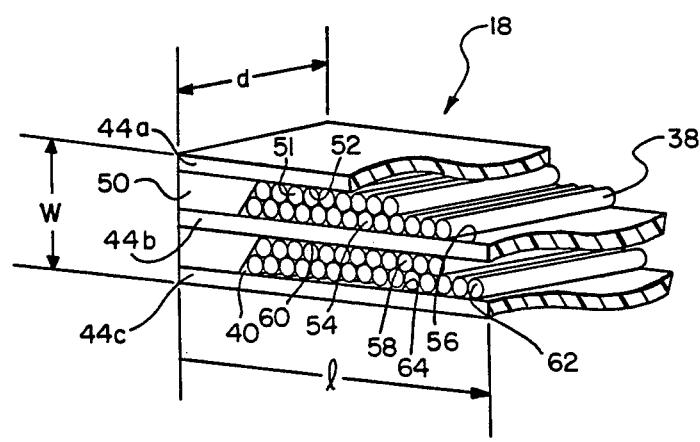
FIG. 2 is an isometric view of an exemplary lens array of the photo imaging system.

In order to accomplish this, the lens 18 is a stacked fiber optical array, shown in FIG. 2 having a length dimension 1, a width dimension w, and a vertical depth dimension d. The array is formed by a number of parallel optical fibers 38 which are fastened together by an adhesive substance 40, and which are separated into row pairs by parallel vertical side or support plates 44. The lens array is characterized by a relatively short total conjugate distance. When the array is mounted inside the camera housing so that its vertical axis is parallel to the housing vertical axis as shown in FIG. 1, light from the light sources 16 is reflected from the bottom of the data card through the lens array 18 and is focused on the cartridge film 34 where the desired image is formed.

It should be appreciated that so-called one-dimensional optical fiber lens arrays are commercially available. These arrays are sometimes referred to as one-dimensional arrays because they are typically composed on one or two rows of adjacent optical fibers; and they are characterized by relatively small width dimensions. Therefore, they are typically used in a scanning mode, such as in photocopying machines, whereby the photosensitive receptor is moved past the lens, or vice versa, to provide a two-dimensional image.

In the present invention, where the lens array and photosensitive receptor are fixed relative to each other during formation of the image, a conventional one-dimensional lens array does not provide a sufficient field width to form a complete image on the photosensitive receptor. Furthermore, image formations by the scanning of a conventional one dimensional array would be unsatisfactory due to the additional size and complexity associated with a scanning mechanism.

It is believed that forming a two-dimensional array by simply adding additional optical fiber rows between adjacent support plates to increase the array width dimension will result in a lens array which does not produce acceptable image quality. More specifically, it is believed that when additional rows of optical fibers are simply stacked together to increase the width dimension of the lens, misalignment of the optical fibers results. That is, the fibers become twisted or bended along their lengthwise axes so that the light paths become skewed and the adjacent images do not overlay and align properly.

In order to overcome this problem of misalignment and the resulting misregistration of images, in the present invention three are provided separate support plates 44a through c as shown in FIG. 2 which are attached at locations adjacent to the lengthwise rows of optical fibers. In this manner, each plate 44 acts as a support frame which helps prevent the twisting and/or bending of the optical fibers.

Figure 3:
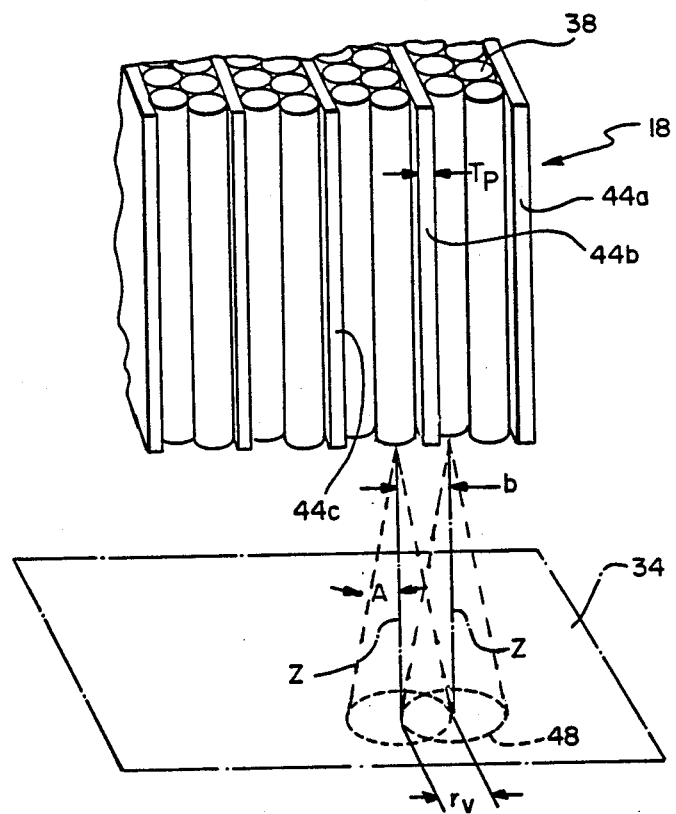
FIG. 3 is a schematical representation showing overlapping images formed by optical fibers of the lens array.

Although this results in the row pairs of optical fibers being separated by the intermediate supporting plate 44b having a thickness $T_p$, image quality is achieved by utilizing a gradient index fiber array lens. In the present invention, images formed by adjacent rows of fibers overlap as shown in FIG. 3 because the light paths diverge when travelling between the lens and the receptor surface. Because the lens array generates a positive one-to-one image of the object, the overlapping images align with each other to achieve satisfactory image quality. More specifically, a half view angle A, defined as an angle between the optical axis Z of the lens fiber and a light path forming an outer edge of the image, is selected so that the image 48 which are generated from the rows of fibers 38 and which are separated by the intermediate support plate 44b, overlay and align on top of each other. Another way of saying this is that the view radius $r_v$, i.e. the distance between the optical axis Z and the edge of the image, is greater than a quantity equal to one half of a distance b (FIG. 3) between the optical axis Z of the second row and third row optical fibers, where $r_v = \tan A \, [(TC-b)/2]$. Due to this image overlay there is only a slight loss of image quality and image illuminance due to the presence of the intermediate support plate. The resulting image is quite satisfactory particularly where the object is highly contrasted such as in the case of printed alphameric data.

It should be appreciated that as greater proportions of adjacent images overlay, then greater and more uniform illumination is achieved. However, the amount of overlay is a function of the total conjugate distance, view angle, and plate thickness. For example, for a constant view angle A, a decrease in conjugate distance TC requires a decrease in plate thickness to maintain the same amount of image overlap and resulting image quality.

To achieve a satisfactory image at a relatively short conjugate distance, the fibers are glass rods which are formed into a gradient index fiber array known as a Selfoc lens, a trademark of Nippon Sheet Glass Co. of Tokyo, Japan, and which is described in greater detail on a data sheet entitled Selfoc lens array (SLA) produced by NSG America, Inc., the contents of which are incorporated herein by reference. As is known in the art, the optical fibers of a Selfoc lens produce an erect positive image at a very short total conjugate distance with a one-to-one ratio of image size to object size.

In order to describe the invention in more detail, reference is made again to FIG. 2 where there is shown the exemplary lens array 18 formed by the pair of outer parallel side plates 44a, 44c and the parallel intermediate plate 44b, with the outer and intermediate plates being joined together at end spacers 50. Located between each side plate and the intermediate plate are two adjacent rows of optical fibers which are slightly offset from each other so that an alternating pattern of optical fibers is formed. The fibers are mounted in a parallel manner with the fibers of the first row 51 being mounted adjacent to an inner surface 52 of the outer side plate 44a, and a second row 54 of fibers having its sides mounted adjacent to a first inner surface 56 of the intermediate plate 44b. A third row of fibers 58 is mounted adjacent to a second opposing inner surface 60 of the intermediate plate, and a fourth row of fibers 62 is mounted adjacent to an inner surface 64 of the outer side plate.

Figure 4:
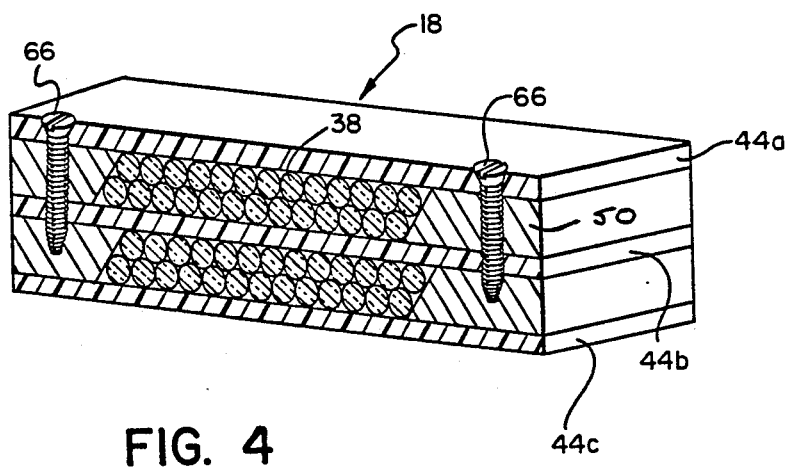
FIG. 4 is a side sectional view of the lens array shown in FIG. 2.

The two-dimensional lens array may be formed by obtaining a commercially available Selfoc Lens Array such as the SLA-06 manufactured by Nippon Sheet Glass Co., Ltd. This array is a one-dimensional gradient-index fiber array having parallel FRP outer side plates. To form a two-dimensional lens array by increasing the width dimension, another one-dimensional Selfoc Lens array is obtained having only one side plate. The opposing exposed side (lacking an FRP side plate) of this array is placed against the outer surface of the side plate of the one-dimensional array, and the two arrays are secured together by fastener material or by screw fasteners 66, as shown in FIG. 4, which extend in a widthwise direction through the end spacers 50. A further increase in the width dimension w of the array is accomplished by obtaining one or more additional conventional one-dimensional arrays each having only one FRP side plate, and attaching the exposed portions of these arrays to a side plate of the two-dimensional array in the manner described previously.

Having described an exemplary lens array of the present invention, attention again will be turned to the camera embodiment shown in FIG. 1. The camera housing 12 includes a ceiling 70, a floor 72, and side walls 74 extending between the floor and the ceiling. The lens array 18 is mounted centrally inside the housing by means of a divider wall and light seal 76 which extends horizontally between the lens array and side walls 74 of the housing. In this manner, the optical fibers are mounted parallel to the vertical axis 14 of the camera and the only exposure of the cartridge film occurs through the lens. The data card support frame 20 is mounted horizontally below the ceiling of the housing and there is provided the openings 24 in the side wall for inserting the data card into the upper frame. Illumination of the data card is provided by the pair of electrically operated light bulbs 16 mounted to the side walls intermediate the data card frame 20 and the lens array 18. Exposure of the photo-sensitive film is controlled by a timer 78 or the like which is connected to a battery 80 mounted near the floor of the camera. Adjacent to the battery is the cartridge support frame 26 mounted horizontally and adjacent to the lower opening 30 in the right side wall for receiving the film cartridge. When the data card and film cartridge are inserted inside the housing, the interior of the camera housing is light-tight so that the only exposure of the film is provided by the light sources.

In operation, the data card 22 is inserted into the card upper support frame 20, and the film cartridge is inserted into the lower support frame 26. The film cartridge 28 includes a conventional light-tight door (not shown) which is opened in a conventional manner after the cartridge has been inserted in the camera housing. The timer is then activated to expose the printed data onto the photosensitive film through the opened door.

In the exemplary embodiment utilizing the SLA-06 lens array, the total conjugate distance is about 74 mm, with a lens lengthwise dimension of about 28.2 mm. This provides sufficient space between the lens 18 and data card 22 for the light source 16, as well between the lens 18 and cartridge 28 to open the light-tight door. Furthermore, the thickness of each plate 44 is about 0.050 of an inch, and the overlap between images is about 2.30 mm.

What is claimed is:

1. A photo imaging apparatus comprising:
    a. housing means;
    b. means for supporting an object element inside the housing means;
    c. means for supporting a photosensitive image receptor inside the container means;
    d. means for illuminating the object element; and
    e. lens array means which are mounted inside the housing means for forming an image of the object element onto the image receptor, the lens array means being non-movable with respect to the receptor element when the image is being formed, the lens array means further including
        (1) a plurality of parallel optical fibers having sides which extend in lengthwise manner intermediate the object support means and the receptor support means, the fibers being mounted together in a manner to form at least three parallel rows, and
        (2) at least two plates mounted adjacent to the sides of the fibers generally parallel to the optical fiber rows for their support in a manner that there is a support plate adjacent to each optical fiber row.

2. The apparatus as set forth in claim 1 wherein:
    a. the optical fibers form first and second adjacent rows, and third and fourth adjacent rows; and
    b. the support plates include (1) a first outer support plate which is adjacent to the first row, (2) an intermediate plate having a first surface which is adjacent to the second row, and a second opposing surface which is adjacent to the third row, and (3) a second outer plate having inner surface which is adjacent to the fourth row.

3. The apparatus as set forth in claim 2 wherein:
    a. the lens array means are spaced apart from the receptor support means at a selected distance; and
    b. the lens array means are characterized in that the optical fibers are the second and third rows, which are separated by the intermediate plate, generate overlapping images on the image receptor.

4. The apparatus as set forth in claim 2 wherein:
    a. the second and third rows of optical fibers are separated from each other across the intermediate plate by a distance b between their respective optical centerlines which are formed by optical axes of the second and third rows; and
    b. the lens array is further characterized in that view radii of the optical fibers of the second and third rows are greater than a quantity equal to one half of the distance b, so that the images formed by the second and third rows overlap.

5. The apparatus as set forth in claim 4 wherein the view radius of each optical fiber is defined as a distance between an optical axis of the fiber and an outer edge of the image.

6. The apparatus as set forth in claim 4 wherein:
    a. the object support means is spaced apart from the lens array means so that there is a selected distance between the object element and the lens array means when the object element is supported in the object support means; and
    b. the illumination means is located intermediate to the object support means and the lens array means so as to illuminate data which is contained on an inner surface of the object element.

7. The apparatus as set forth in claim 6 wherein the lens array means is a gradient index lens array which forms a positive one-to-one image of the object element on the image receptor.

* * * * *

UNITED STATES PATENT AND TRADEMARK OFFICE
CERTIFICATE OF CORRECTION

PATENT NO. : 4,740,803
DATED : April 26, 1988
INVENTOR(S) : James A. Hardy

It is certified that error appears in the above-identified patent and that said Letters Patent is hereby corrected as shown below:

Column 5, line 44, "container" should read -- housing --.

Column 6, line 21, "are" should read -- of --.

Signed and Sealed this

Eleventh Day of October, 1988

Attest:

DONALD J. QUIGG

Attesting Officer

Commissioner of Patents and Trademarks